Nov. 19, 1929.   H. E. TOMLINSON   1,736,142
MACHINE FOR CLEANING COTTON
Filed June 6, 1928   3 Sheets-Sheet 2

INVENTOR:
HOMER E. TOMLINSON.
By Elliott Warrington
ATTORNEYS.

Nov. 19, 1929.         H. E. TOMLINSON         1,736,142
            MACHINE FOR CLEANING COTTON
                Filed June 6, 1928        3 Sheets-Sheet 3
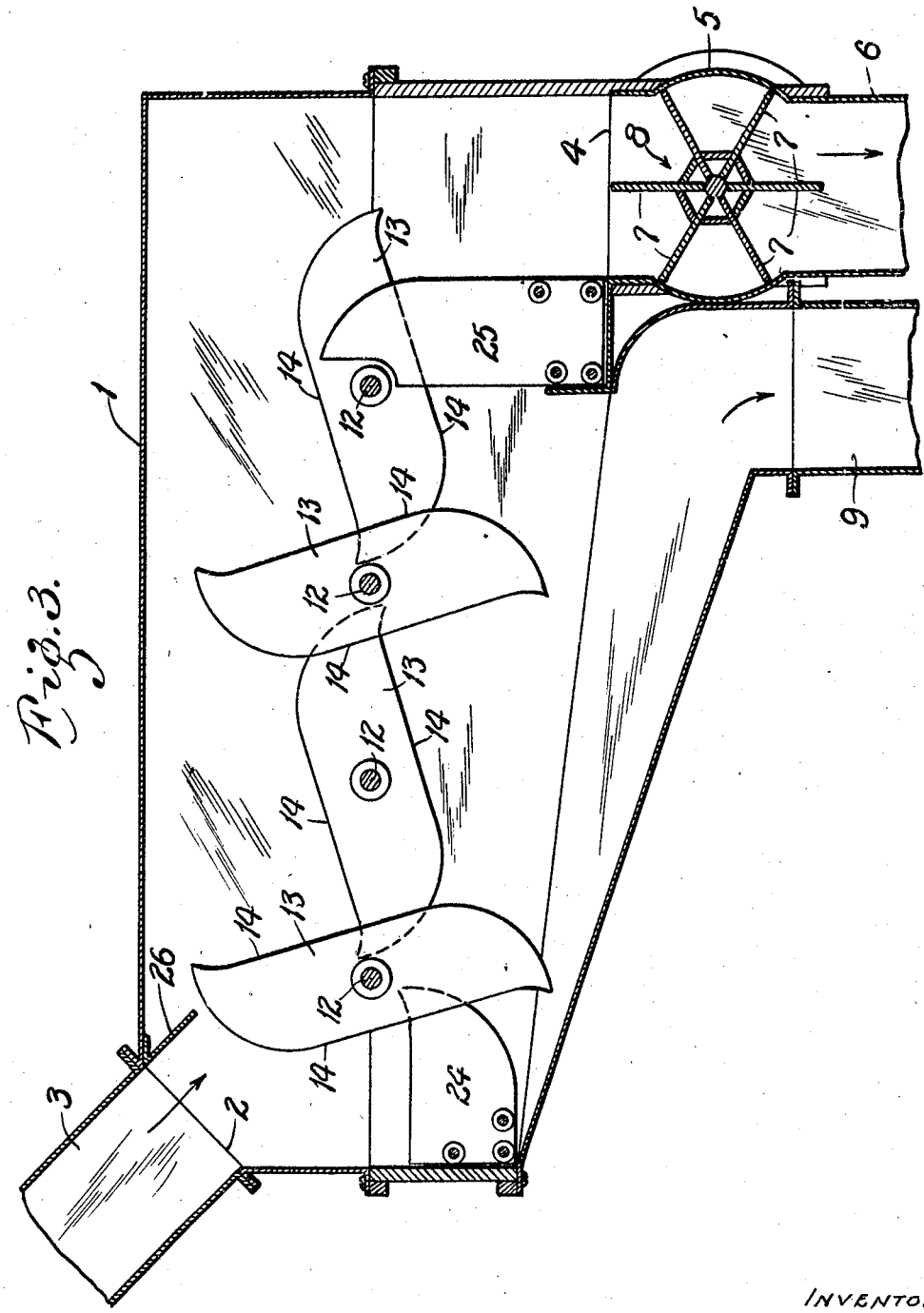
INVENTOR:
HOMER E. TOMLINSON.
By Elliott & Harrington
ATTORNEYS.

Patented Nov. 19, 1929

1,736,142

UNITED STATES PATENT OFFICE

HOMER E. TOMLINSON, OF MALDEN, MISSOURI

MACHINE FOR CLEANING COTTON

Application filed June 6, 1928. Serial No. 283,258.

This invention relates to a novel machine and process for cleaning seed cotton, and has for its general object to provide for the thorough cleaning of the seed cotton by removing therefrom foreign matter such as small pieces of leaves, shale, dirt, and the like, without machining the cotton, as by subjecting it to the action of spiked rollers, drawing it repeatedly over wire screens, and otherwise subjecting it to frictional contact with surfaces, which is incident to the use of machines now generally employed for this purpose.

A further object of the invention is to provide novel means for transporting the cotton and simultaneously agitating and cleaning the same.

Another object of the invention is to provide a novel machine for use in cleaning seed cotton which shall also be adapted to act as a vacuum box or dropper, into which the seed cotton is drawn by suction from a wagon, thoroughly agitated and cleaned, and conveyed to an outlet remote from the entrance and there permitted to drop onto a distributor belt for delivery to the gin stands, and in which operation the air is separated from the cotton without the use of stationary screens.

The leading feature of the invention consists in novel means for receiving, agitating, and transporting the cotton, and simultaneously separating dirt, shale, and so forth, therefrom, and also permitting the air to separate from the cotton, said novel transporting and agitating means comprising a plurality of series of members having reversely curved surfaces on opposite edges, and adjacent series of such members being mounted to rotate in alternate interposed relation with each other, and also being so timed and positioned as to maintain an angular surface relation of 90°. The construction, arrangement, and operation of these members insure that the members of one series shall always be interposed between the members of adjacent series so that at all times the rotating members provide spaces of substantially uniform dimensions throughout through which the air and dirt and small particles of foreign matter may pass, while at the same time preventing the formation of any large opening through which particles of cotton might escape.

I wish it understood that my novel transporting devices are not limited in application to conveying and agitating cotton, but may be used in other relations where such character of transportation with agitation and separation may be desired.

The invention is illustrated in the accompanying drawings, in which—

Figure 3 is a longitudinal sectional view.

Figure 1:
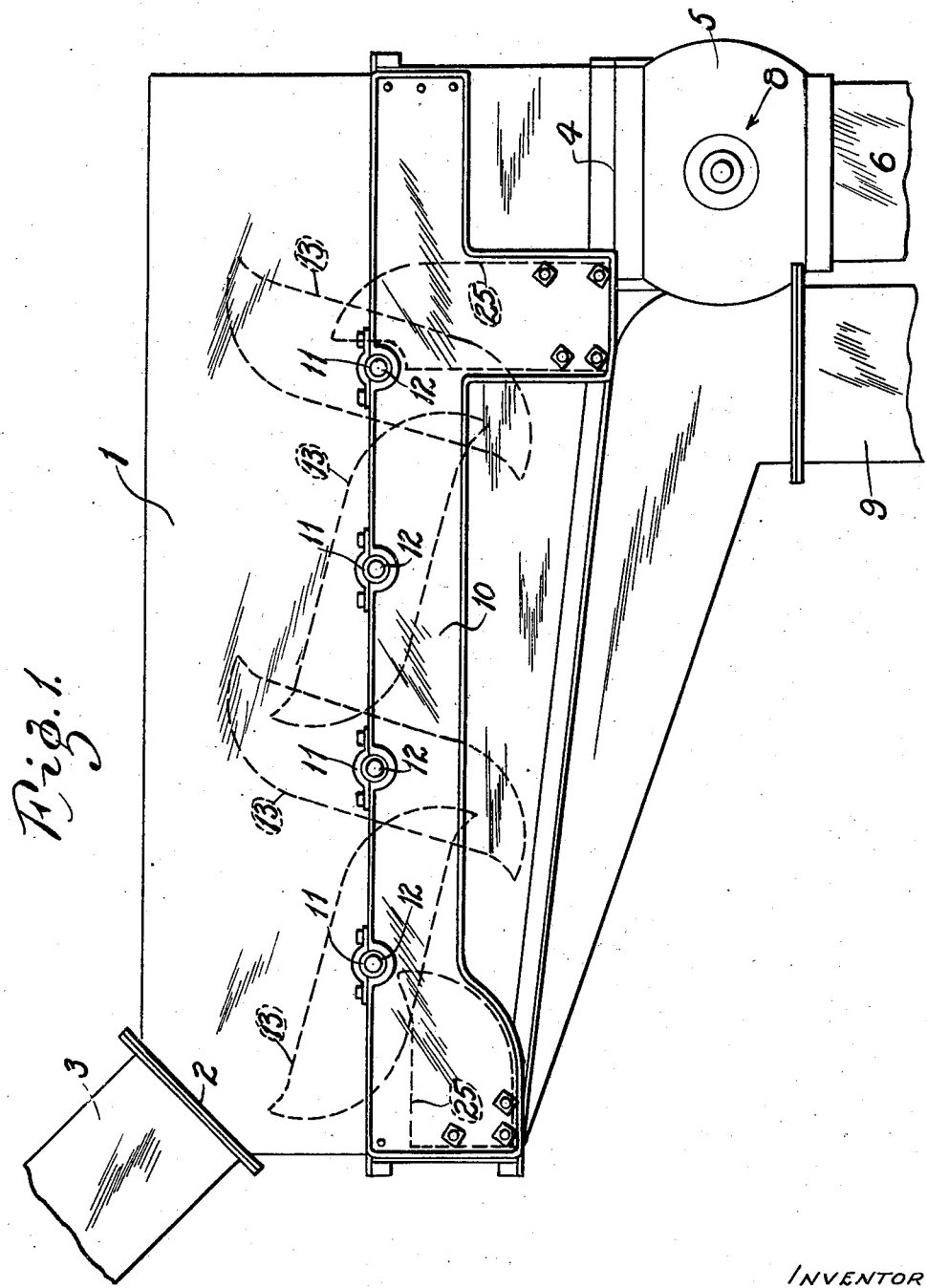
Figure 1 is a view in side elevation of my improved seed cotton cleaning machine, the combined conveyors and agitators being shown in dotted lines.

Referring now to the drawings, the numeral 1 indicates the casing of my improved machine which, at its upper side at one end, is provided with an inlet opening 2 from which leads a pipe 3 which, as usual, is adapted to have a flexible extension connected to it which may have its end applied to the cotton in a wagon so that the cotton may be drawn into the casing 1. At the opposite end of the casing 1 and at its lower side is provided an outlet opening 4 beneath which is provided an air-tight housing 5, to the bottom of which is secured the upper end of an outlet pipe 6. The housing 5, in effect, provides curved walls on opposite sides of the outlet 4 for engagement with the ends of the blades 7 of a rotary dropper 8, this construction, as is well known, serving to maintain the casing 1 substantially air-tight while air is being drawn therethrough. That is to say two of the blades 7 are always in engagement with the walls of the housing 5 at opposite sides and the cotton from the casing 1 continually falls into the space between the blades and is carried around and dropped into the pipe 6, the blades preventing air from passing up through the pipe 6. The numeral 9 indicates an air-duct which communicates with the casing 1 at the bottom thereof, and the end of said pipe, as usual, communicating with a suction fan for exhausting air from the casing 1 and thereby drawing in cotton through the pipe 3 from a source of supply, such as a wagon.

Figure 2:
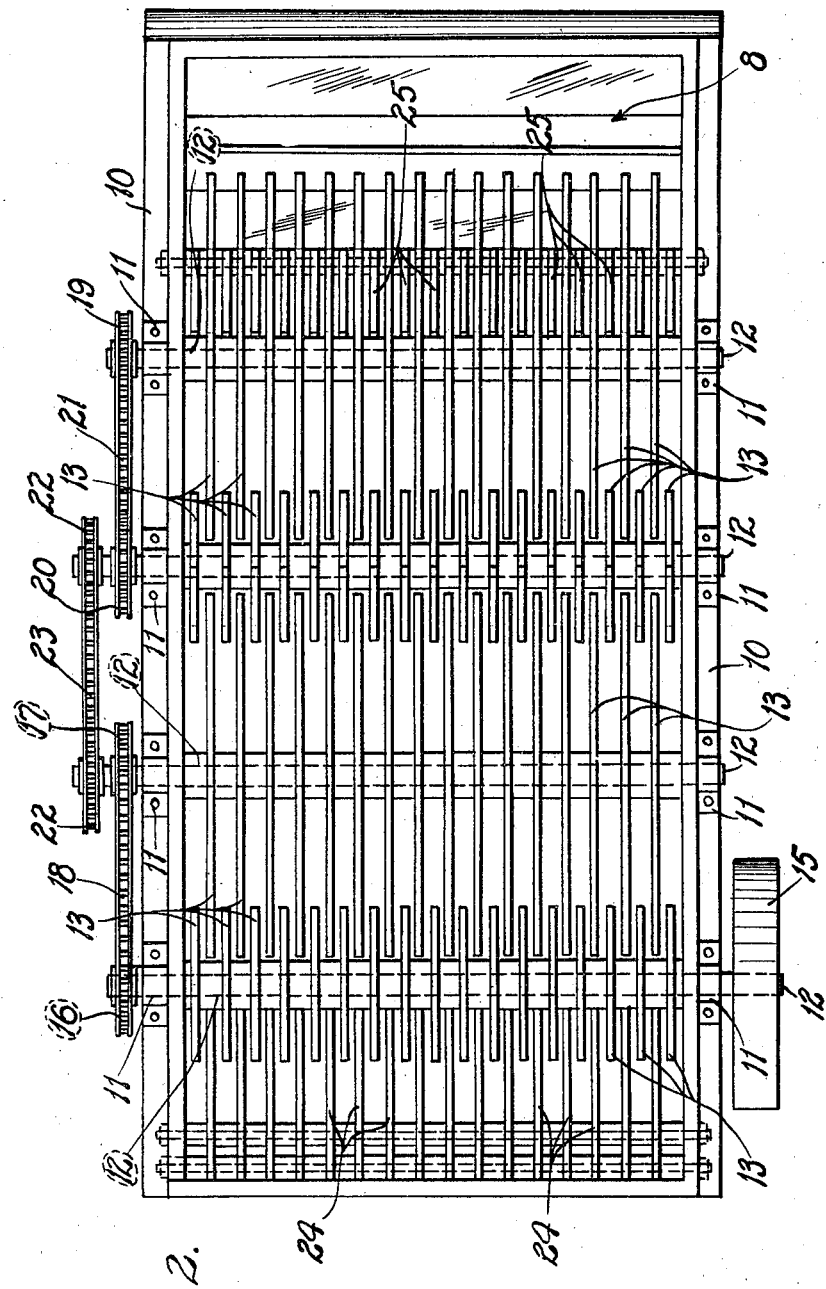
Figure 2 is a plan view of the same with the upper part of the casing removed and looking down upon the combined agitators and conveyors.

Referring to Fig. 1, the numeral 10 indicates a cast metal bar, one of these bars being mounted on each side of the casing 1 and extending from end to end thereof, as shown. On its upper edge, each bar is provided with a plurality of bearings 11 located at equal distances apart and in which are supported the ends of shafts 12 which extend transversely through the casing and through the walls thereof and have their ends supported in bearings 11. Fixedly secured on each of the shafts 12 are a number of combined transporting and agitating members 13, these members being separated from each other by a distance of approximately three-sixteenths of an inch, and each member having a width of approximately one-sixteenth of an inch. The width of the casing 1 may approximate thirty-two inches and, as shown by Fig. 2, each series of members 13 extends from side to side thereof. Each of the members 13 is formed of a body of sheet metal having marginal edges in the form of compound curves arranged in reverse relation with respect to each other, the curves being of such formation that the members 13 have the shape of a typical hysteresis curve. The opposite sides 14 of each member 13 are substantially straight for a portion of their length and are parallel with each other. Each of the members 13 in length will be approximately thirty inches, and in width, eight inches. The shaft 12 near the left-hand side of the machine shown in the drawings is provided at one end with a pulley 15 by means of which the shaft may be rotated by a belt in the ordinary way, and on the other end of said shaft is mounted a sprocket wheel 16, a similar sprocket wheel 17 being mounted on the corresponding end of the adjacent shaft 12. Over these sprocket wheels passes a sprocket chain 18. At the other end of the machine, the two adjacent shafts 12 are similarly provided with sprockets 19 and 20 over which passes a sprocket chain 21. The two shafts 12 intermediate the end shafts are extended beyond the sprocket wheels 17 and 20, respectively, and have mounted on their ends sprockets 22 connected by a sprocket chain 23. As the pulley 15 is driven, the various shafts 12 will be rotated in unison through the sprocket and chain connection described and the speed of rotation may be that which experience may prove to be necessary in any given case. For example, in the cotton cleaning machine shown, each series of members 13 may be rotated at approximately the speed of 300 R. P. M.

As shown by Fig. 3, the members 13 are positioned with their side edges 14 at an angle of 90° to each other, and this relation of the members 13 to each other is maintained in the revolutions thereof. This insures that one series of the members 13 shall never have its position advanced or retarded with reference to an adjacent series, or adjacent series, and thus prevents one series from separating from, or passing out from, between the members of an adjacent series.

At the left-hand end of the casing 1 at the bottom thereof, I provide a stationary series of separating members 24 which are of the same width as the members 13 and alternate in position with the members 13 of the series adjacent the left-hand end of the casing 1. That is to say, the members 13 of said series in rotating continuously pass between the stationary members 24. This will be clearly apparent from an inspection of Fig. 2.

In like manner, at the right-hand end of the casing 1, a series of stationary members 25 is provided, these being vertically disposed and located at the left of the outlet opening 4. The members 25 correspond in function to the members 24 in that the members 13 of the series adjacent the right-hand end of the casing 1 continuously pass between the series of members 25 in rotation.

I preferably provide a baffle 26 (Fig. 3) projecting inward from the upper side of the inlet opening 2 to insure that the incoming air and cotton shall be prevented from passing horizontally over the top of the revolving members 13 adjacent to said opening. In other words, the baffle 26 insures a downward course to the air and cotton as it enters the casing 1.

In the operation of the device, the cotton being sucked in through the opening 2 is thereby propelled with considerable force against the first series of members 13, assuming, for example, that the position of these members is that shown in Fig. 3. In the continued revolution of the members, the lower ends of the first series of members 13 will engage the cotton and lift and propel it forwardly or to the right, where it will, in like manner, be engaged by the second series of members 13 and be lifted still farther to the right until the final series of members 13 causes the cotton to be delivered into the dropper 8. During this operation, the air is, of course, continuously passing through the series of members 13, carrying with it more or less of the dirt and small particles of trash mixed with the cotton, and with each lifting and forward movement of the cotton caused by the revolution of the members 13, intense agitation is provided which serves to loosen up the cotton and cause the dirt and trash to be separated therefrom and be drawn through the spaces between the members 13 by the air. In this manner, the cotton will be thoroughly cleaned so far as the character of foreign materials previously referred to is concerned. It will be seen that in the movement of the cotton through the machine from the inlet 2 to the outlet 4, it is at no time subjected to a rubbing or drawing action such as that occasioned by passing it over a screen through the medium of spiked rollers, which results in what is known as machining the cotton; that is to say, the spikes of the rollers continuously pull cotton out of the body of cotton passing over the screens, due to the resistance to movement offered by the screen, which is increased by the air drawn through the screens, which tends to hold the cotton against the same, which action on the cotton results in breaking the long fibers and proportionately injuring the cotton and decreasing its value.

In the use of my improved machine, the action on the cotton is that of continuously lifting and advancing the cotton with, of course, resultant impact of the ends of the members 13 engaging the cotton which, however, does not in any manner injure the cotton, as no resistance is offered to its passing from one series of members 13 to the next series. On the contrary, the sudden impact of the members 13 as they engage the cotton gives the necessary agitation to loosen the dirt and small particles of trash and permit them to be separated from the cotton and be drawn through the spaces between the members 13 by the air.

It will be seen from the above that I entirely eliminate the use of a separating screen in the casing 1, and thus prevent all clogging therein due to the seed cotton sticking to the screen instead of falling out of the air as intended, the screen forming the outlet for the air that lifts the cotton from the wagon or other source of supply. Furthermore, I likewise dispense with screens for separating the dirt and small particles of trash from the cotton, the function of both forms of screen being supplied by the members 13 which thus act as combined transporting or conveying, agitating, and screening members.

I have shown four series of the members 13 as mounted in the casing 1, but it will be understood that the invention is not limited to the use of this number on the one hand, nor does it require the use of this number on the other. In other words, any desired number of series of the members 13 may be used as circumstances may indicate to be desirable.

Finally, I desire to call attention to the fact that my invention is distinguished from all other machines or methods known to me of cleaning cotton and simultaneously moving the same, in that in all instances in the prior art, the movement of the cotton is effected by rollers usually having spikes or other engaging members which drag the cotton over a screen, whereas with my invention, the cotton is repeatedly lifted and each lifting operation involves also a transportation of the cotton through the casing of the machine in an uninterrupted manner, so that the cotton is always kept, as it were, in the clear; that is to say, it is acted on only from beneath and advanced uninterruptedly through the casing of the machine by the various members engaging it. It will readily be seen that this prevents all machining of the cotton, as the latter is lifted bodily and transported bodily.

I claim:

1. A machine for cleaning seed cotton comprising a casing, a plurality of transverse series of spaced parallel members of greater length than width each of which extends above and below an axis of rotation, said members being mounted to rotate in continuous interposed relation to each other and extending from an inlet to an outlet in said casing, means for simultaneously and uniformly rotating all of said series of members, and means for creating a blast of air through said inlet and through the spaces between said members.

2. A machine for cleaning seed cotton comprising a casing, a plurality of transverse series of spaced parallel members of greater length than width each of which extends above and below an axis of rotation, said members being mounted to rotate in continuous interposed relation to each other and extending from an inlet to an outlet in said casing, means for simultaneously and uniformly rotating all of said series of members, means for creating a blast of air through said inlet and through the spaces between said members, and rotatable means for removing cotton through said outlet and maintaining sealing contact with the wall thereof.

3. A machine for cleaning seed cotton, comprising a casing, a plurality of transverse series of spaced parallel members of greater length than width, each of which extends above and below an axis of rotation, said members being mounted to rotate in continuous interposed relation to each other, whereby to continuously lift and advance the cotton in stages from an inlet to an outlet in said casing, and operating as the sole support for the cotton in its passage through the casing, means for simultaneously and uniformly rotating all of said series of members, and means for creating a blast of air through said cotton and through the spaces between said members.

4. A machine for transporting material, comprising a series of equally-spaced horizontally-disposed shafts, a series of spaced parallel members of greater length than width mounted on each shaft in transverse alinement with each other, each of said members extending longitudinally beyond its shaft in both directions for a distance substantially equal to the distance between the two adjacent shafts and being of a width to extend transversely beyond its shaft in both directions, the width of the members being such that each series of members will be in continuous interposed relation with the two adjacent series of members in all positions of the members when their shafts are rotated in unison in the same direction.

5. A machine for transporting material, comprising a series of equally-spaced horizontally-disposed shafts, a series of spaced parallel members of greater length than width mounted on each shaft in transverse alinement with each other, each of said members extending longitudinally beyond its shaft in both directions for a distance substantially equal to the distance between the two adjacent shafts and being of a width to extend transversely beyond its shaft in both directions, the respective series of members having a relatively angular disposition of ninety degrees, and the width of the members being such that each series of members will be in continuous interposed relation with the two adjacent series of members in all positions of the members when their shafts are rotated in unison in the same direction.

6. A machine for transporting material, comprising a series of equally-spaced horizontally-disposed shafts, a series of spaced parallel members having the general shape of a hysteresis curve mounted on each shaft in transverse alinement with each other, each of said members extending longitudinally beyond its shaft in both directions for a distance substantially equal to the distance between the two adjacent shafts and being of a width to extend transversely beyond its shaft in both directions, the respective series of members having a relative angular disposition of ninety degrees, and the width of the members being such that each series of members will be in continuous interposed relation with the two adjacent series of members in all positions of the members when their shafts are rotated in unison in the same direction.

7. A machine of the class described, comprising a casing, a series of equally-spaced horizontally-disposed shafts rotatably mounted therein, a series of spaced parallel members of greater length than width mounted on each shaft in transverse alinement with each other, each of said members extending longitudinally beyond its shaft in both directions for a distance substantially equal to the distance between the two adjacent shafts, and being of a width to extend transversely beyond its shaft in both directions, the width of the members being such that each series of members will be in continuous interposed relation with the two adjacent series of members in all positions of the members when their shafts are rotated in unison in the same direction, said series of members extending from an inlet to an outlet in said casing, and means for simultaneously and uniformly rotating all of said series of members.

In testimony whereof, I have hereunto set my hand.

HOMER E. TOMLINSON.